United States Patent

Kruppa

[11] Patent Number: 5,887,075
[45] Date of Patent: Mar. 23, 1999

[54] METHOD, AND APPARATUS AND ARTICLE OF MANUFACTURE FOR FILTERING PERIODIC NOISE FROM A MAGNETIC READ HEAD

[75] Inventor: Robert W. Kruppa, Cary, N.C.

[73] Assignee: International Business Machines Corporation, Armonk, N.Y.

[21] Appl. No.: 831,267

[22] Filed: Mar. 31, 1997

[51] Int. Cl.$^6$ .............................. G06K 9/00; G06K 7/20
[52] U.S. Cl. ................................. 382/139; 382/320
[58] Field of Search .................... 382/137, 139, 382/183, 320; 235/449

[56] References Cited

U.S. PATENT DOCUMENTS

| | | | |
|---|---|---|---|
| 4,245,268 | 1/1981 | Toshimitsu | 360/124 |
| 4,797,938 | 1/1989 | Will | 382/7 |
| 4,984,117 | 1/1991 | Nölke et al. | 360/124 |
| 5,400,409 | 3/1995 | Linhard | 381/92 |
| 5,495,929 | 3/1996 | Batalianets et al. | 194/207 |

Primary Examiner—Andrew W. Johns
Attorney, Agent, or Firm—John D. Flynn

[57] ABSTRACT

A method, apparatus and article of manufacture is disclosed for eliminating periodic noise detected by a magnetic read head. In particular a time varying signal electrical signal is provided by a magnetic read head. The signal is sampled and stored in memory. Samples known not to contain a desired signal are used to extract a waveform representative of a single period of periodic noise. The representative waveform is synchronized with samples containing the desired signal and used to compensate the samples containing the desired signal in order to minimize, reduce, cancel or remove the effects of the periodic noise on samples containing the periodic noise. The compensated samples are then processed to obtain information from the desired signals.

20 Claims, 12 Drawing Sheets

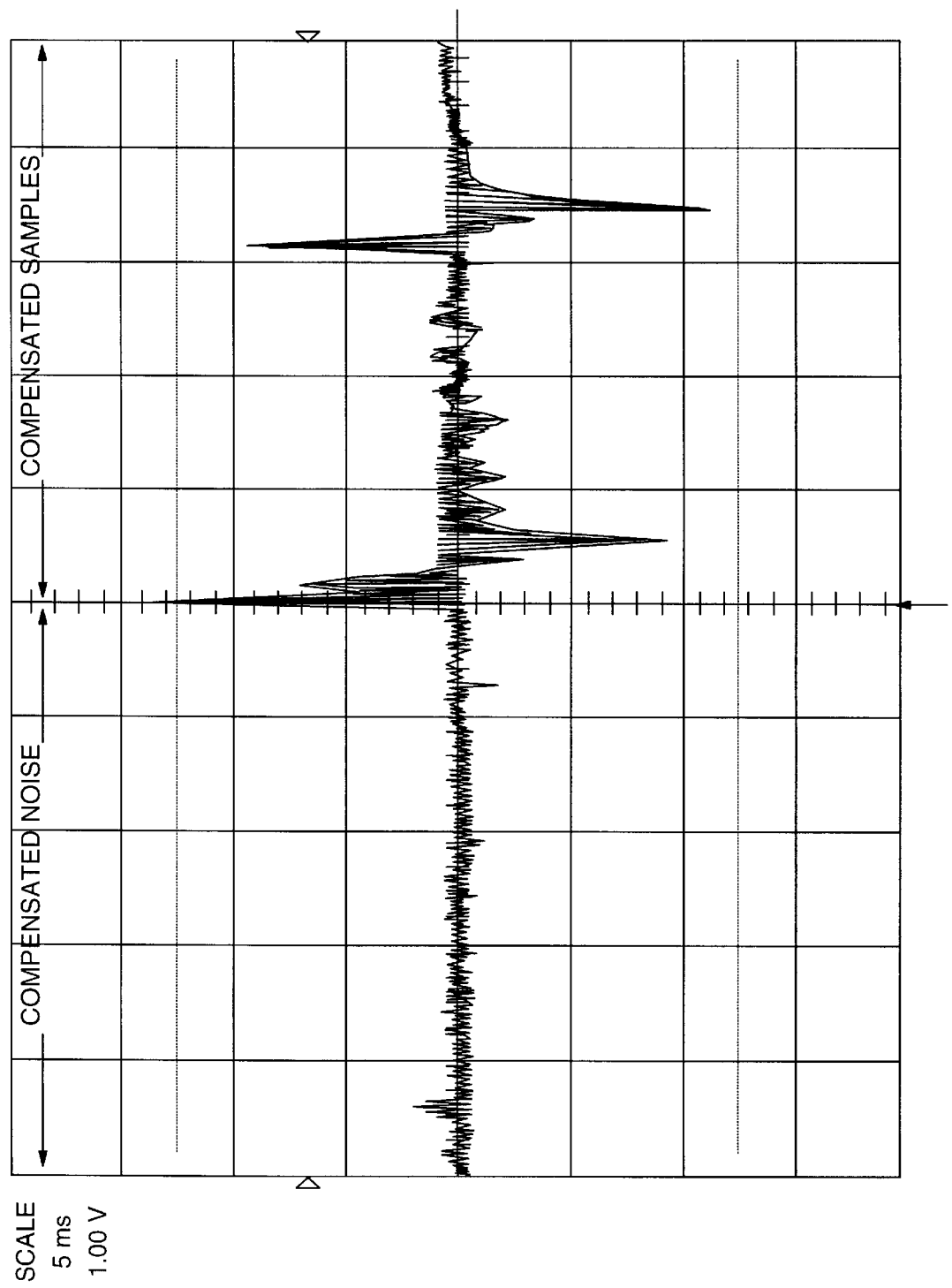

METHOD, AND APPARATUS AND ARTICLE OF MANUFACTURE FOR FILTERING PERIODIC NOISE FROM A MAGNETIC READ HEAD

BACKGROUND OF THE INVENTION

1. Field of the Invention

The present invention relates to identifying a periodic noise signal and removing the noise signal from a received signal stream when a desired signal is present. More particularly, it relates to a method, apparatus and article of manufacture for removing display interference from signals received from a magnetic head associated with a magnetic ink character reader.

2. Description of the Prior Art

Magnetic Ink characters are characters or symbols which are printed on a document in magnetic ink. Documents containing magnetic ink characters are typically bank checks, deposit slips and other documents. The magnetic ink characters may be printed in a standardized format or font (e.g., "E13B" or "CMC7" font) and are typically located near an edge of a document.

The magnetic ink characters are read by a magnetic head as the head moves across the document or the document is caused to move pass the head. The magnetic signals "picked up" by the head are converted to electrical signals which are processed by a magnetic ink character recognition unit which outputs the characters typically in ASCII or EBCDIC format.

Document processing systems with a MICR capability can be affected by magnetic interference which slows or prevents magnetic ink characters from being read. Magnetic coils such as for example electromagnetic coils generate magnetic fields resulting in interference relative to the magnetic information stored in the magnetic ink portion of a document. These interference signals may arise from nearby equipment such as displays, scanners, the MICR processing system itself, or motors and other electromechanical devices that may be used to move documents, etc.

This is particularly a problem in Point-of-Sale (POS) environments where MICR readers are typically located very near a check out display and where MICR information is obtained from checks tendered by customers. Due to lack of aisle space or the desire to more efficiently utilize floor space POS systems deployment usually result in the MICR or MSR device in close proximity to a CRT or other POS peripheral devices. This is particularly important when a MICR read head is located close to a display device because the display interference caused by the flyback or the retrace signal from the operation of the CRT. The coil from the CRT produces a significant source of noise to the MICR read head. Most POS systems also permit the display to be moved which changes the noise picked up by the magnetic read head.

One prior art solution to this problem is to use shielding. The source of the radiation, such as a display or coil, is shielded or the magnetic read head itself is shielded or partially shielded. Shielding can be used on the source or the pickup or a combination of both can be utilized. Because complete shielding is not possible, shielding does not eliminate the interference problem but, merely reduces the interference signal picked up by the magnetic read head. Furthermore, shielding is costly to implement given the high cost of the metal shielding material used and the extra steps required to apply shielding during the manufacturing process. Shielding can also cause other problems such as heating or overheating of components.

Another prior art solution is to add a second magnetic read head that is used to measure the magnetic interference signal. The electrical signal generated by the second magnetic read head can then be subtracted from the signal containing both the magnetic interference and the MICR characters. This solution requires a second read head and a means for subtracting one signal from the other. Additionally, this technique is imperfect because the two read heads cannot occupy the same physical space so that the interference signal pickup by the second read head may be substantially different then the interference picked up by the first magnetic read head. This is because the magnetic interference signals are different at the two locations. Thus, the use of two heads can result in self-interference.

These unresolved problems and deficiencies are clearly felt in the art and are solved by the invention in the manner described below.

SUMMARY OF THE INVENTION

The above-mentioned needs have been met in accordance with the present invention by providing a method, apparatus and article of manufacture for eliminating periodic noise detected by a magnetic read head. In particular, a time varying electrical signal is provided by a magnetic read head. The signal is sampled and stored in memory. Samples known not to contain a desired signal are used to extract a waveform representative of a single period of periodic noise. The representative waveform is synchronized with samples containing the desired signal and used to compensate the samples containing the desired signal in order to minimize, reduce, cancel or remove the effects of the periodic noise on samples containing the periodic noise. The compensated samples are then processed to obtain information from the desired signals.

It is an object of the present invention to provide a magnetic read system which can operate precisely and accurately even in the presence of magnetic interference fields without the use of shielding.

It is yet another object of the present invention to provide cost effective noise immune decoding of magnetically encoded signals.

It is a further object of the present invention to provide a magnetic read system which can operate precisely and accurately even in the presence of magnetic interference fields without the use of a second magnetic read head.

It is yet another object of the present invention to reduce the interference of periodic noise in a desired signal.

It is yet another object of the present invention to reduce the interference of periodic noise in a desired signal by sampling the periodic noise signal when the desired signal is not present and to use the sampled data to subtract noise from the desired signal when the desired signal is present.

It is an object of the present invention to provide more accurate reading of magnetic ink characters.

It is yet another object of the present invention to read magnetic ink characters with a reduced read errors.

BRIEF DESCRIPTION OF THE DRAWINGS

The foregoing and other objects, aspects and advantages of the invention will be better understood from the following detailed description with reference to the drawings, in which:

FIG. 4(c) depicts the digital samples with noise removed.

DETAILED DESCRIPTION

The present invention will be described with respect to a Point-of-Sale (POS) Magnetic Ink Character Recognition (MICR) device. It should be noted however that present invention is also applicable to other types of magnetic read devices including but not limited to magnetic tape heads, magnetic disks, magnetic strip reader (MSR) or other electronic devices that operate in environments having periodic noise and periods when only the periodic noise is detected by the reading device.

Using MICR technology, information is encoded on a surface using magnetic ink and an associated font. The fonts permit electrical signals obtained from a MICR read head to be more easily distinguished from one other. Magnetic ink characters generate particular electrical wave form signals when the characters are moved relative to the MICR read head. E13B font is used for processing of checks in the United States. Although, MICR is particularly useful in processing of checks there are many other applications that make use of MICR technology.

The relative motion of the magnetic material with respect to the read head generates a changing magnetic field which is converted to a time varying electrical signal by the read head. The encoded surface moving relative to the read head cause the MICR head to output a time varying voltage which corresponds to the magnetic characteristics of the surface passing near the head.

Figure 1:
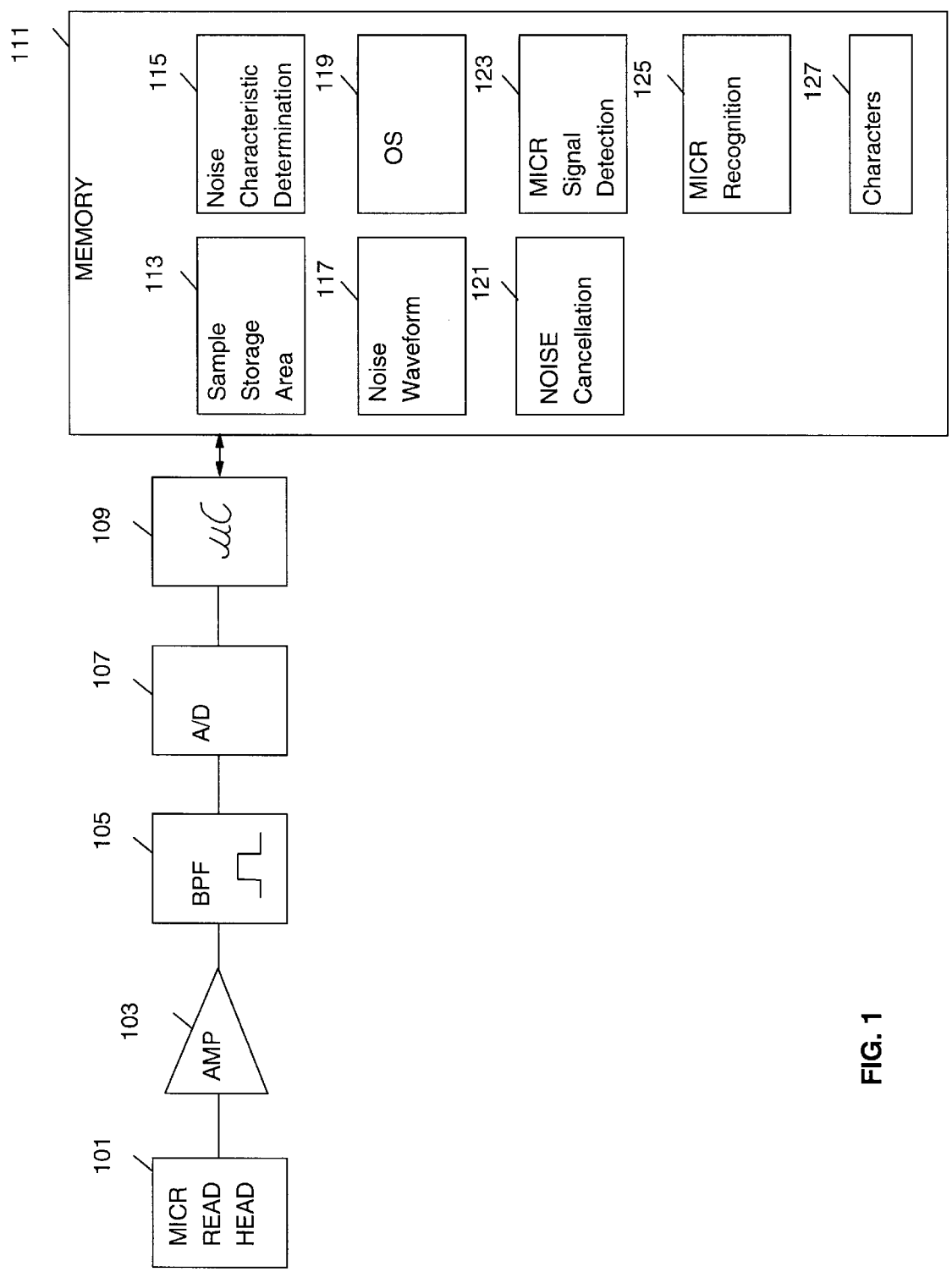
FIG. 1 depicts an overview of a MICR system in accordance with the present invention.

FIG. 1 depicts an overview of the present invention. The magnetic read head 101 provides a time varying analog signal that is proportional to the magnetic field sensed at the read head. The time varying electrical signals for E13B magnetic ink characters passing a magnetic read head are shown in FIG. 5. The time varying electrical signal produced by the magnetic read 101 is amplified by amplifier 103. In the preferred embodiment the amplifier supplies a time varying signal in a certain voltage range such as 0 to +5 volts. The amplifier produces an amplified time varying signal that is offset by a voltage of 2.5 volts. The offset voltage assures that the time varying signal at the amplifier output is positive and can be provided by a single-ended operational amplifier using a single voltage. The amplified time varying signal (or the time varying signal from the read head) may also pass through a band pass filter 105. The bandpass filter eliminates noise picked up by the magnetic read head 101 by removing undesirable frequency components from the time varying analog signal. Note that since the desired magnetic field is produced by relative motion of the encoded surface with respect to the read head, higher frequency and lower frequency magnetic noise can be eliminated from the time varying signal by the bandpass filter. The exact band of frequencies to pass can be determined from analyzing the expected relative speed. The MICR head performs best with a constant document speed. In general, as velocity increases so does the signal to noise ratio. Typically a speed of 5 inches per second is used. Although, in the preferred embodiment the bandpass filter is implemented using analog circuit elements the bandpass filter could be implemented using, the microcontroller and a bandpass filter software function.

In the preferred embodiment the resulting signal from the amp and bandpass filter is usually between 0 and +5 volts. This time varying signal is then sent to A/D converter 107 which converts the analog voltage to digital samples. In the preferred embodiment, the A/D converter provides 8 bits per sample at 200 microsecond intervals. The digital samples are then provided to microcontroller 109. The microcontroller 109 has access to memory 111 and stores each sample from the A/D converter in the sample storage area 113. The samples are typically written to memory in successive fashion. This preserves the timing relationship between samples. Although typically written to successive memory locations the present invention can use any scheme of storing the samples. In the preferred embodiment the microcontroller 109, A/D Converter 107, and memory 111 are included in the same integrated circuit (IC) as a microcontroller package. These functions may also be implemented using a Digital Signal Processor (DSP).

Also shown in memory are several different software systems then can be carried out by the microcontroller including: the operating system 119, noise characteristic determination 115, noise compensation function 121, desired or MICR signal detection function 123, and the MICR recognition function 125. Other areas of memory are shown for storing data such as: the representative noise waveform 117, sample storage area 113, and character output area 127. Other storage areas may be utilized as well, for instance the MICR recognition function may use magnetic ink font profiles that are stored in a memory area.

The preferred embodiment of the present invention contains one or more software systems or software components or functions. In this context, a software system is a collection of one or more executable software programs, and one or more storage areas (for example, RAM, ROM, cache, disk, flash memory, PCMCIA, CD-ROM, Server's Memory, ftp accessible memory, etc.) In general terms, a software system should be understood to comprise a fully functional software embodiment of a function or collection of functions, which can be added to an existing processing system to provide new function to that processing system. Software systems generally are constructed in a layered fashion. In a layered system, a lowest level software system is usually the operating system which enables the hardware to execute software instructions.

A software system is thus understood to be a software implementation of a function which can be carried out in a processor system providing new functionality. Also, in general, the interface provided by one software system to another software system is well-defined. It should be understood in the context of the present invention that delineations between software systems are representative of the preferred implementation. However, the present invention may be implemented using any combination or separation of software or hardware systems.

The software systems may be distributed on a computer usable medium such as floppy disk, diskettes, CD-ROM, PCMCIA cards, flash memory cards and/or any other computer usable medium. Note that the software system may also be downloaded to a processor via a communications network or from an Internet node accessible via a communications adapter.

Figure 2:
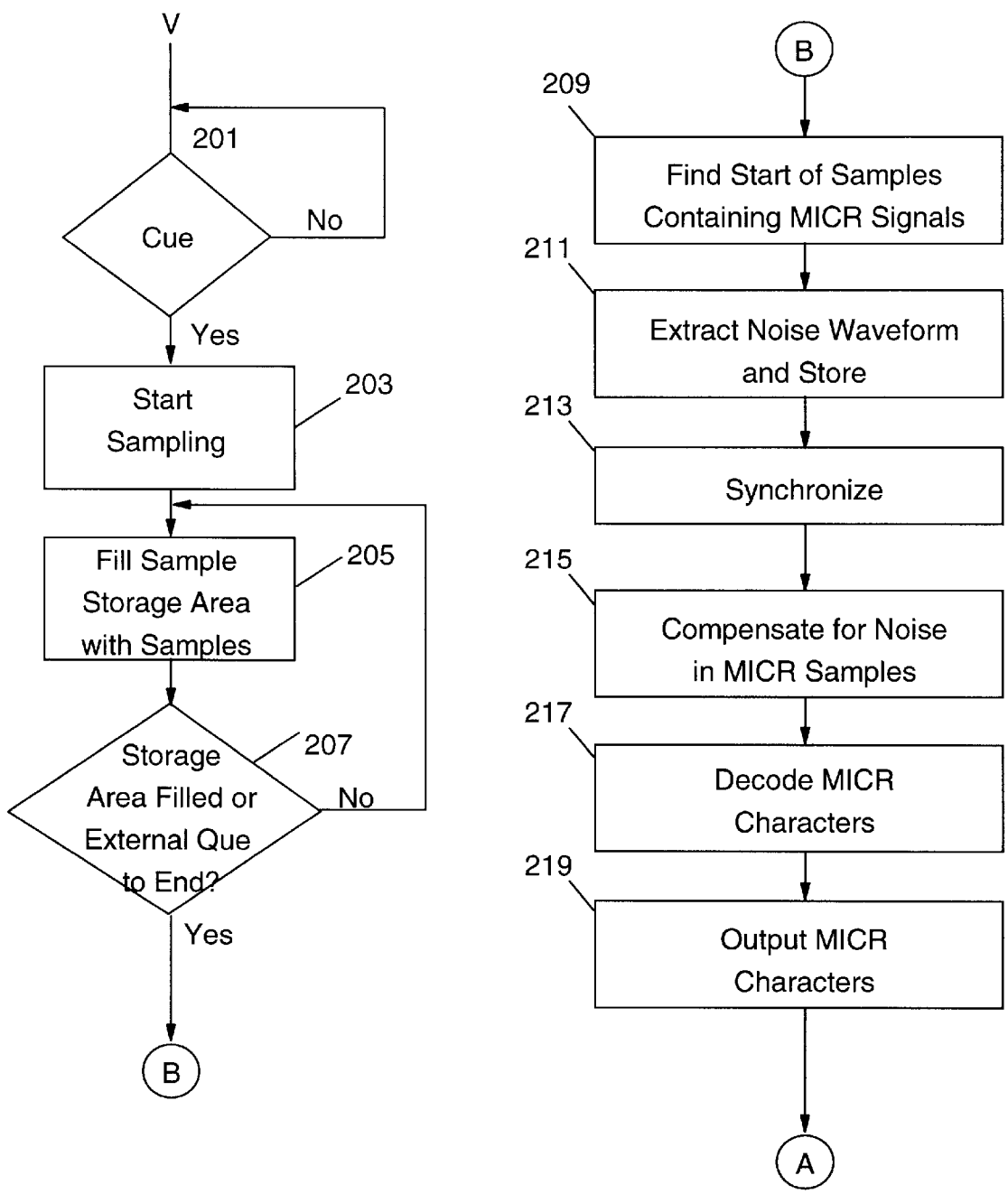
FIG. 2 depicts sample processing by the MICR microcontroller.

FIG. 2 depicts the steps performed by the MICR device in detecting magnetic ink characters and outputting the text characters in accordance with the preferred embodiment of the present invention. Although the MICR device could continually read samples and store them in memory using a circular buffer or queue, a preferred method is to use an external cue to start storing samples to memory. Assuming the MICR device is controlled by another device such as a printer or POS system or host device, the other device normally will issue a MICR read command upon detection of a document or as part of POS transaction processing. The microcontroller can use the command or detection of the document or activation of the document feed motor(s) or some other cue to start sampling and/or the storing of samples to the sample storage area.

After receiving an appropriate cue in step 201, the MICR device begins sampling the input stream from the magnetic read head in step 203. The samples are stored into a memory area in step 205. This process is repeated until the memory area is filled or an external cue is received to stop sampling. The external cue could be from a paper sensor, printer or the host device. In the preferred embodiment as depicted in FIG. 2, samples are stored in memory until the memory area allocated to the sample storage area is filled or an external cue is activated (e.g., Document end). In the preferred embodiment the sample storage area can contain 65 MICR characters of data. In the preferred embodiment sampling is done at 125 samples per magnetic ink character yielding approximately 3100 samples per scan. Samples obtained from a single pass of a document or bank check are referred to as a scan. Samples from a scan are stored in memory in a sequential manner. Thus, regions of memory can be identified as containing the desired signal or not containing the desired signal.

The present invention is directed toward removing periodic noise picked up by a MICR read head. This is particularly important when a MICR read head is located close to a display device because of the display interference caused by the flyback or the retrace signal from the operation of the CRT. The magnetic interference introduced by flyback or retrace is very periodic and somewhat consistent. The noise waveform is extracted from samples that do not contain the desired or MICR signal.

Having sampled and stored a scan, the MICR method next determines where in the sample stream the MICR characters begin. This shown as step 209. It is assumed, as is the case for bank checks, that sampling is begun before MICR characters are passed near the MICR read head. This provides a number of samples that do not contain the MICR signals. An alternative to identifying which samples contain a desired signal the software system could identify which area(s) of memory contain noise only samples.

Having determined which samples do not contain the MICR signal, a representative noise waveform may be extracted from these samples. This is shown in step 211. A representative noise wave form is extracted and stored in an appropriate area of memory. The wave form is synchronized with the samples containing the MICR data in step 213. Having aligned or synchronized the periodic noise waveform in step 213, the samples containing the composite MICR/noise signal can be compensated for the periodic noise. This can be accomplished using a subtraction operation in step 215. Having removed the noise in step 215, the compensated samples are then provided for MICR decoding in step 217 and outputting of the decoded MICR characters in step 219. The process may be started again in step 201.

MICR Signal Detection

Figure 3A:
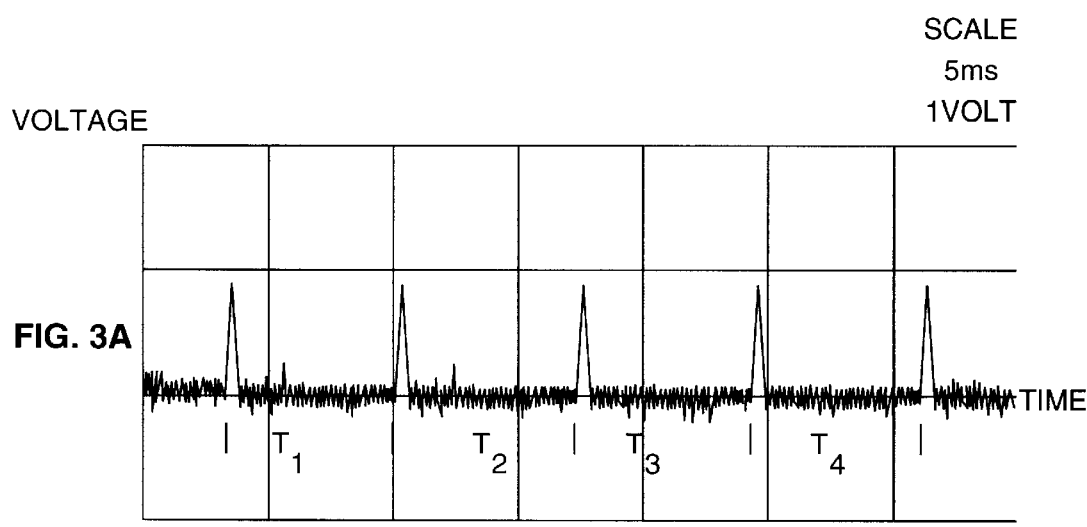
FIG. 3(a) depicts a periodic analog noise.
Figure 3B:
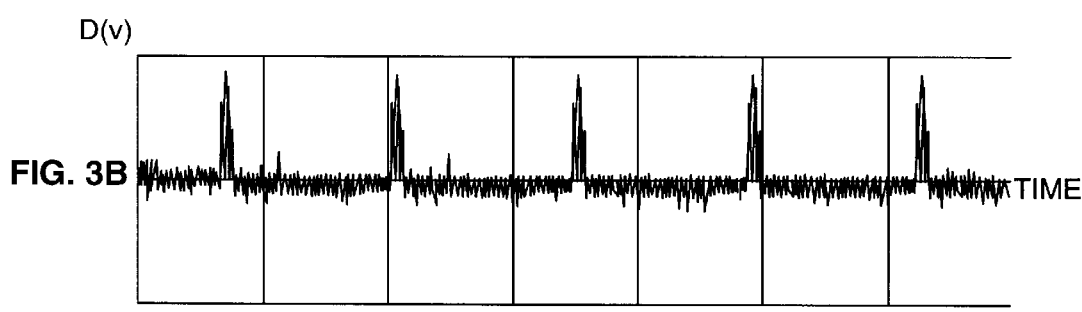
FIG. 3(b) depicts samples of a periodic analog noise.

The MICR signal detection function determines which areas of memory are believed to contain samples having MICR signal content and conversely which areas of memory have samples representing noise only. The determination of where samples containing MICR signals begin provides several benefits first, it allows a representation of the periodic noise wave form to be extracted from samples that do not contain the MICR signal; secondly, it permits synchronization of the extracted noise wave form with the samples containing the MICR signal; and thirdly it allows the MICR recognition function to work with samples containing the MICR signals. An alternative to identifying the memory address of the first sample containing the desired signals is to use the first X number of samples from a scan as a basis for extracting a representation of the periodic noise waveform. The representation of the periodic noise can also be extracted from other samples known not to contain the desired MICR signals (e.g., end of scan samples). FIG. 3(b) depicts samples that do not contain desired MICR signals and which correspond to analog signals showing periodic noise shown in FIG. 3(a).

The starting address of the samples deemed to contain the desired signal is determined by the MICR signal detection function. The ending address may also be provided. The MICR signal detection function serves to determine whether one or more samples contains a desired signal (i.e., a MICR or MICR like signal). Since magnetic ink characters generate particular electrical waveform signals when moved past a MICR read head, the MICR signal detection function can use knowledge of the MICR signals to determine if the samples represent MICR characters. Any one of a variety of algorithms may be used to determine whether or not a MICR signal has been detected in the sample stream. One simple detection scheme is to start with the first sample and proceed sample by sample until a sample with a value exceeding a predefined threshold is found. Samples after the one have the predetermined threshold are assumed to contain the MICR signal content. A variation is of this scheme uses a number of consecutive samples exceeding the predetermined threshold level as the start of the MICR samples. An alternative detection scheme can using exceeding a moving average threshold for a plurality of samples.

The MICR signal detection identifies samples (or the start of samples ) that contain the desired signal. Thus, samples that contain only the periodic noise signal and background noise are stored in the sample storage area initially. All samples contain the noise signal even those containing the desired signal. If MICR characters or the desired signal are not detected in the samples, the samples may be used to extract the periodic noise waveform or a representation of the periodic noise waveform.

Periodic Noise Characterization

Characterization of the noise waveform consists of determining the peridocity of the noise (i.e, represented by number of samples given a fixed sample interval) and the wave shape for a noise period (i.e., the values which will be used to compensate the appropriate MICR samples). An example of periodic noise is shown in FIG. 3(a). FIG. 3(b) depicts the digital samples obtained from sampling the analog signal shown in FIG. 3(a). In FIG. 3(a), the periodic noise waveform can be seen starting in period $T_1$, then repeating in $T_2$, and continuing onward to $T_n$. Although a noise waveform as long as the MICR signal containing samples could be stored in memory it is preferably to extract a representative noise waveform that can be used and repeated to create or estimate the periodic noise signal. The noise is regular in that it follows the same periodic patterns although there may be some random variations in its shape.

The period of the noise waveform may be determined by counting the number of samples between rise times. Thus, when a rising edge is detected above a certain threshold samples are counted to the next rise time. The period of the periodic noise signal can be measured by the number of samples between the rising edges.

In the preferred embodiment rather then storing a plurality of periods of noise data a single period representative of the noise can be used and repeated as required. A number of different techniques may be used to obtain the values to use in the representative noise waveform. The representative noise waveform can be obtained by selecting a single noise period such as that found between $T_1$ and $T_2$ shown in FIG. 3. The samples from this particular noise period could be used to represent the periodic noise signal. Using a signal noise period has the drawback that it is subject to random noise fluctuations or less accurate wave shape determination due to sampling rates.

Figure 3C:
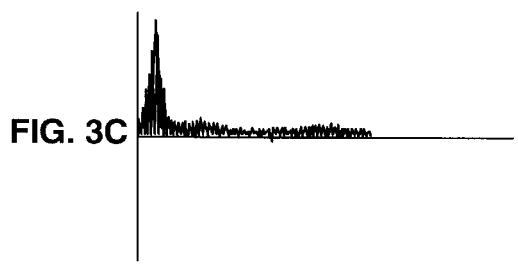
FIG. 3(c) depicts a representative noise waveform.
Figure 3D:
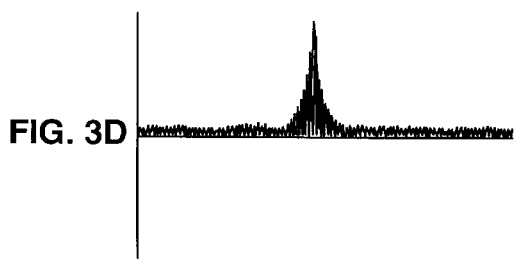
FIG. 3(d) depicts a representative noise waveform.
Figure 4A:
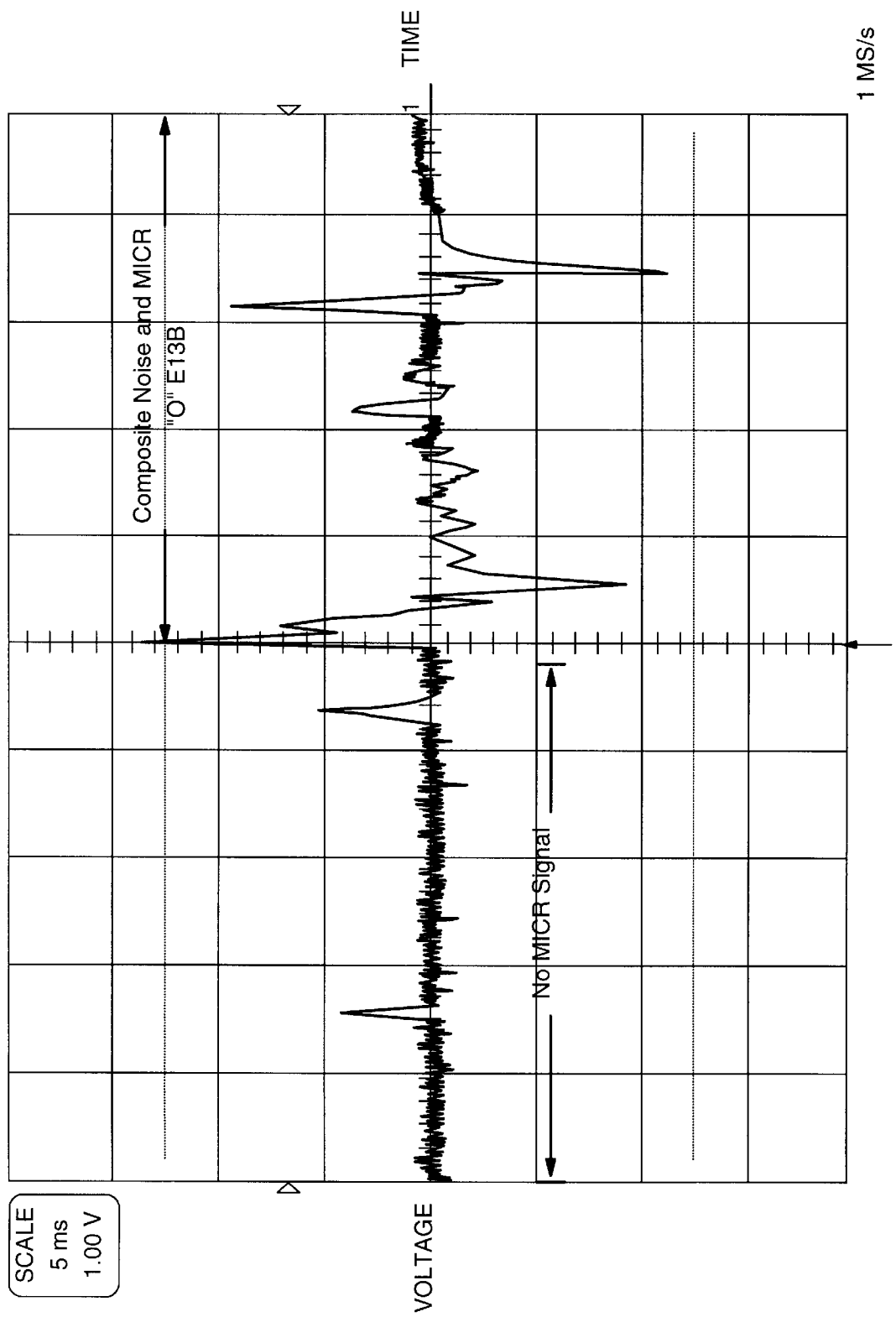
FIG. 4(a) depicts analog voltage resulting from the MICR Read head passing over MICR characters including the periodic noise source.
Figure 4B:
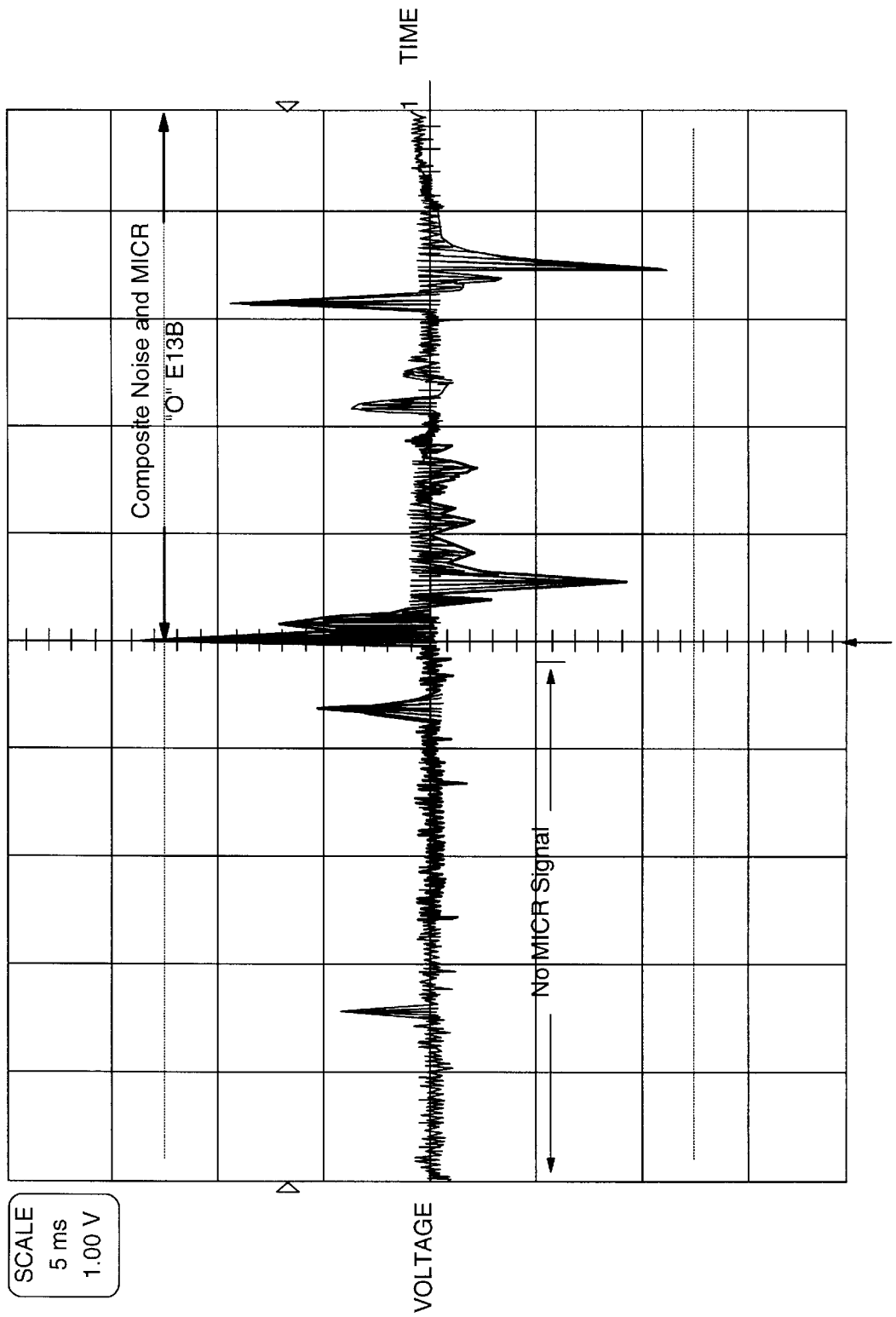
FIG. 4(b) depicts the digital samples of the voltages shown in FIG. 4(a).
Figure 5A:
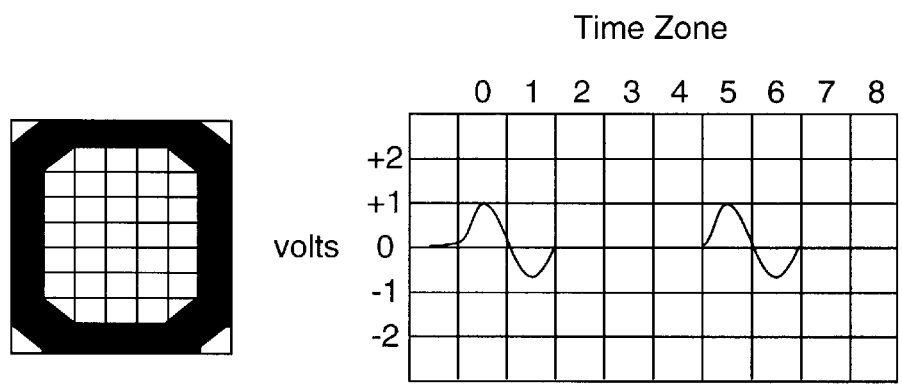
FIG. 5 shows time versus voltage plots of electrical signals produced by a magnetic read head when reading characters from the E13B type font printed on a document.
Figure 5B:
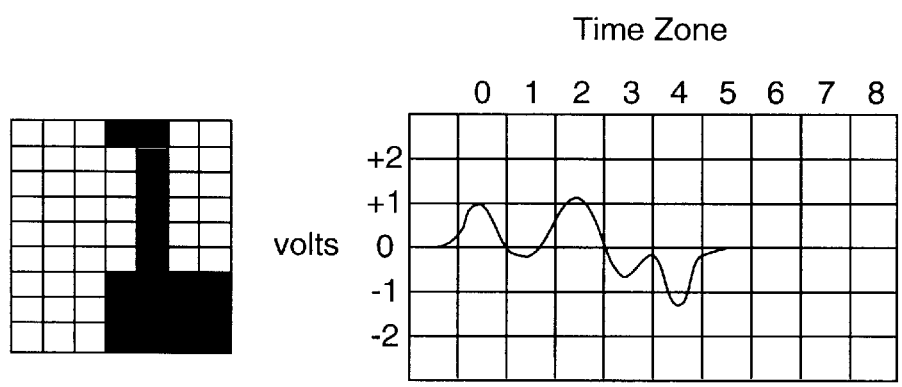
Figure 5C:
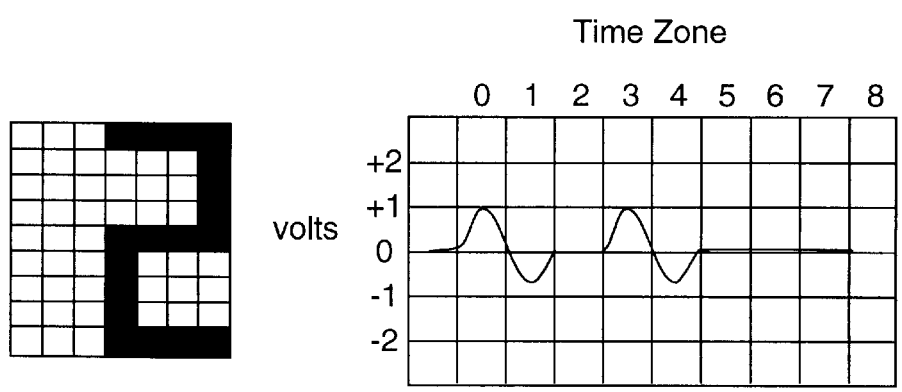
Figure 5D:
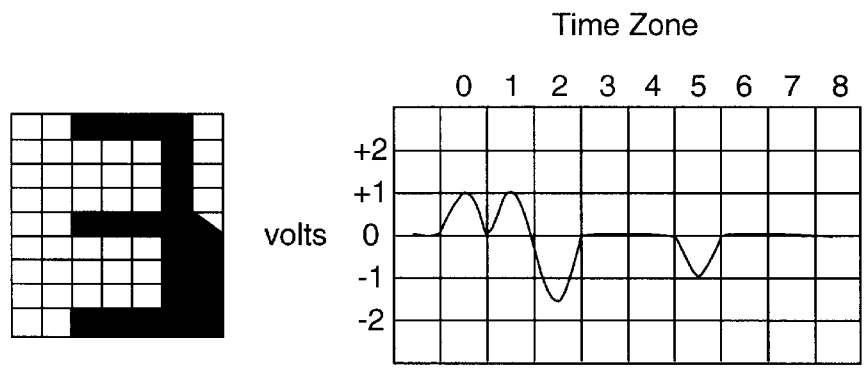
Figure 5E:
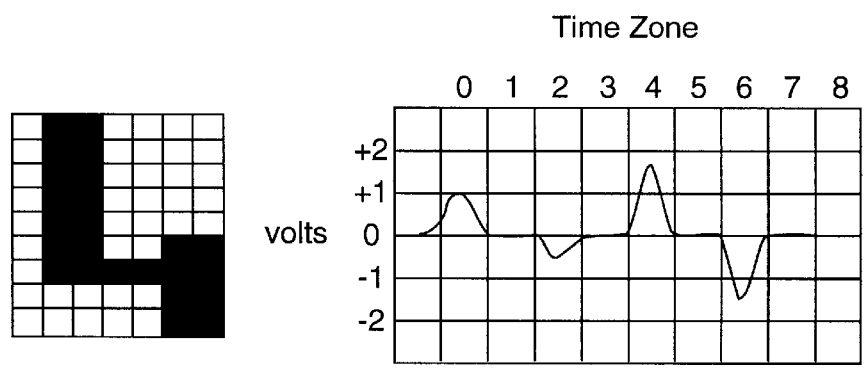
Figure 5F:
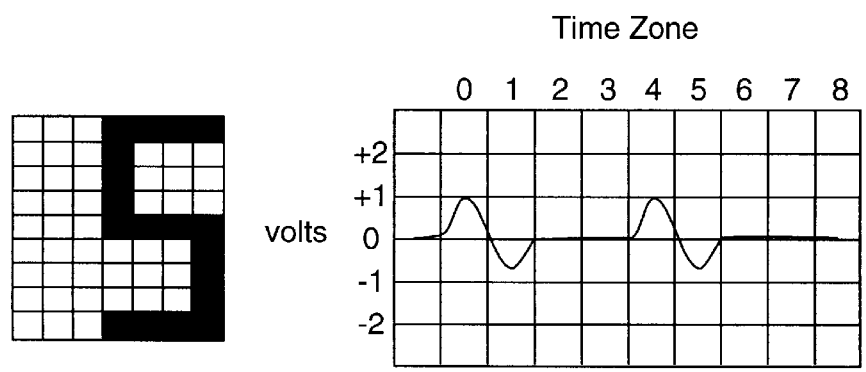
Figure 5G:
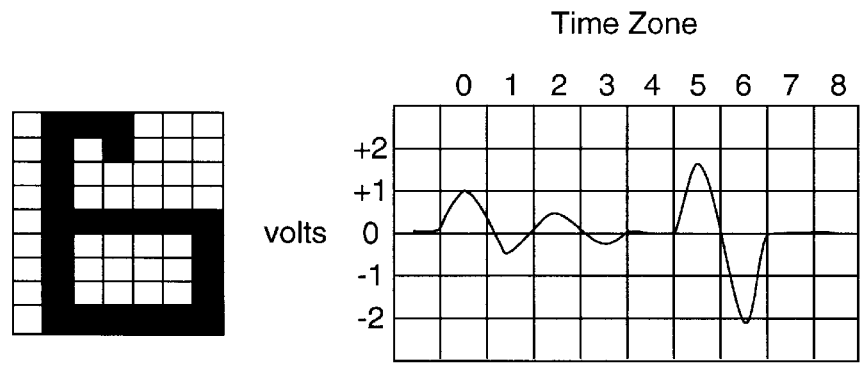
Figure 5H:
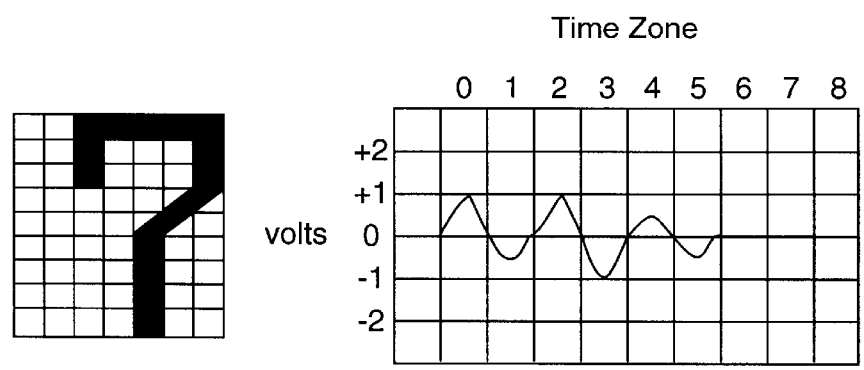
Figure 5I:
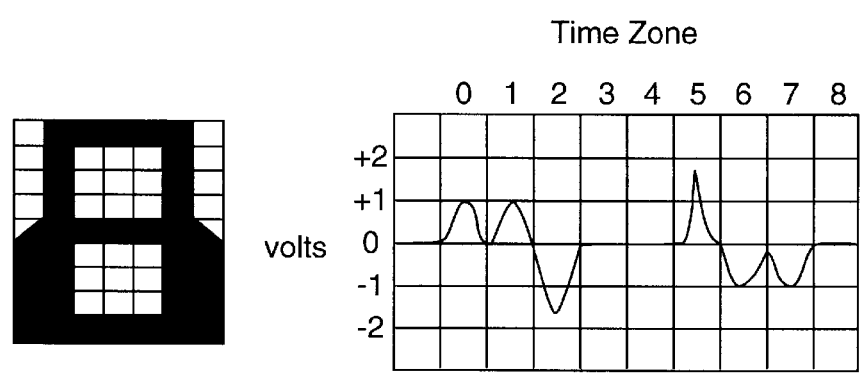
Figure 5J:
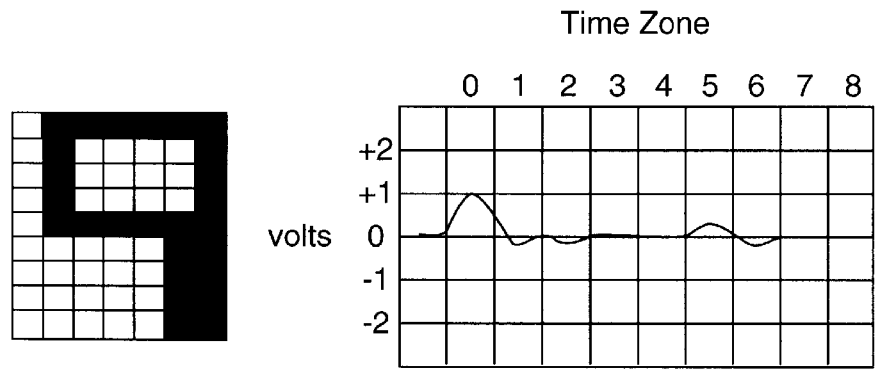
Figure 5K:
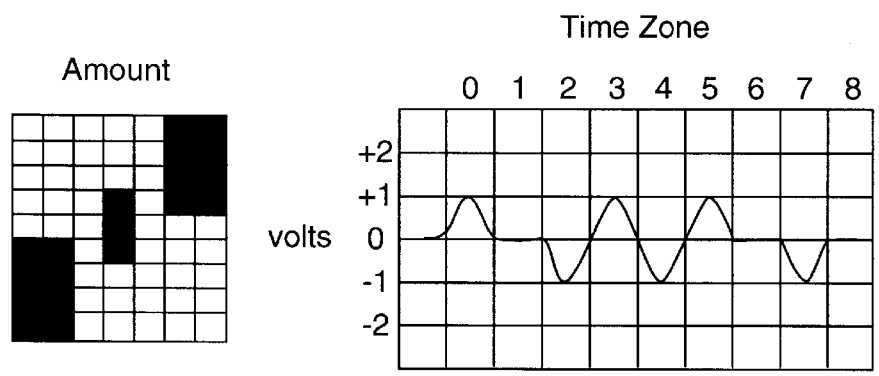
Figure 5L:
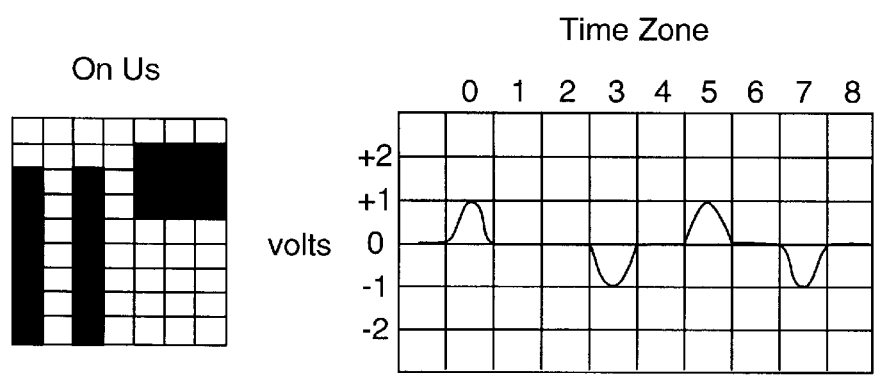
Figure 5M:
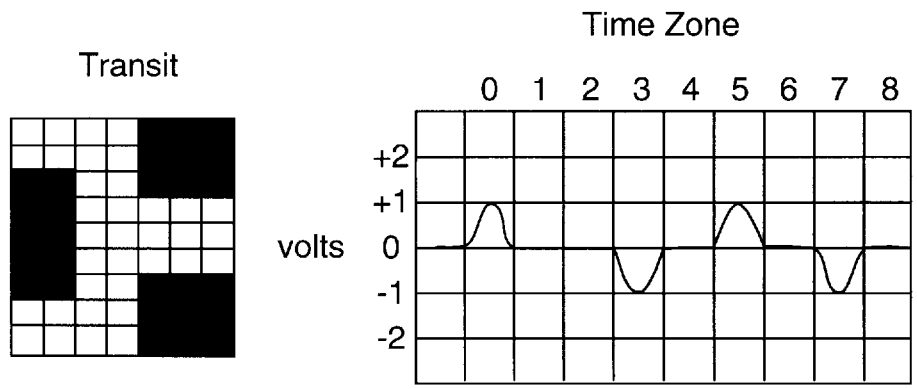
Figure 5N:
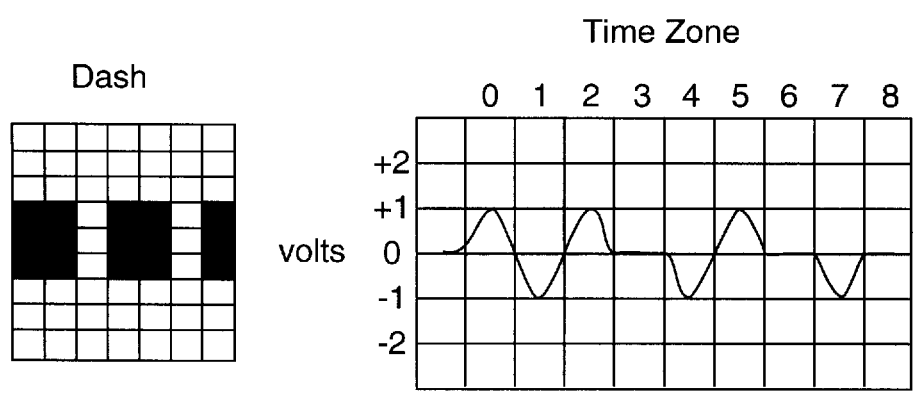

A preferred technique is to use the samples from a plurality of periods and combine the samples in some fashion. Samples from several noise periods are depicted in FIG. 3(b). For instance, using values from several noise periods a mean or average value could be utilized in determining the noise values in the representative noise waveform. Averaging over several periods provides a more accurate representation of the noise. The noise from several periods may be averaged in order to eliminate spurious effects due to background noise or sampling rates and provides a better estimate of the contribution from the periodic noise source such as the display. In the preferred embodiment the noise waveform is obtained from n noise periods which are then averaged to obtain the noise waveform. Since the noise waveform is periodic, it may be stored as a single set of representative values. FIG. 3(c) shows a noise waveform with a single set of values with a given start time. FIG. 3(d) shows the same set of values with a different start time. Note that the start time can be represented by the location in memory that any given periodic noise waveform begins. The number of values in the set determines the period or periodicity of the noise waveform. Assuming a 200 $\mu$ second sampling rate, 20 values would represent a noise period of 4 msec ($20 \times 200$ $\mu$ secs).

If the noise period is represented as $n_L$ samples then a representative noise waveform can be determined from samples containing only noise data beginning at memory location Y and storing the representative noise waveform at memory location Z using p noise periods by a simple average algorithm as follows:

For k=0 to $n_L$-1

$$[Z+k]:=([Y+k]+[Y+n_L+k]+[Y+2n_L+k]+ \ldots +[Y+(p-1)n_L+k])/p$$

where:

p is the number of periods $n_L$ is number of samples per period.

The noise waveform characteristics can be updated whenever a MICR signal is not detected in a group of samples. This allows the microcontroller to track variations that may develop in a noise source due to a change in orientation of the noise source with respect to the magnetic read head.

Synchronization and Compensation

Knowing the period and values of the noise waveform, the microcontroller can then synchronize the samples containing the MICR data with the representative noise waveform. Synchronization aligns the noise waveform samples and the start of the samples containing the MICR signal. This allows for proper cancellation of the noise from the MICR containing samples. The representative noise waveform is replicated as many times as necessary to compensate for the periodic noise in all samples containing the MICR signals.

Figure 6:
FIG. 6(a) shows a time varying signal.
FIG. 6(b) shows a memory map for storing the digitized time varying signal.
FIG. 6(c) shows a memory map of the representative noise waveform values.
Figure 6:
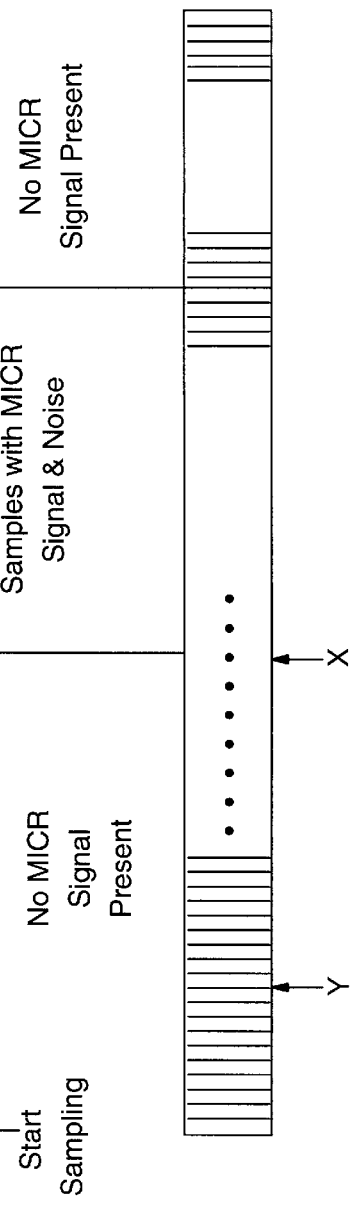
Figure 6:
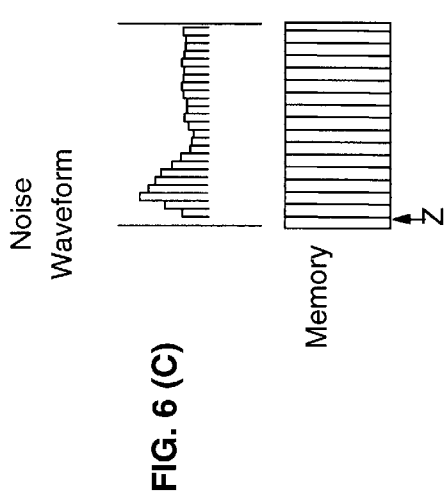

FIG. 6(b) shows a sample storage area. The first area 601 contains no MICR signals or noise only. The second area 603 contains the desired MICR signal as well as the periodic noise. The third area 605 contains only the periodic noise data. A representative noise waveform may be determined from samples in areas 601 or 605 or both. FIG. 6(c) depicts a representative noise waveform obtained by averaging noise only data from period 601. The representative noise waveform begins and ends with the rise of the noise pulse. The representative noise waveform consist of $n_L$ values.

The samples containing MICR signals have been identified as contained in (or starting at) a certain area of memory. The representative noise waveform shown in FIG. 6(c) is synchronized with the samples containing the MICR signals and noise. Synchronizing permits the representative waveform values to be canceled or subtracted from the desired MICR samples at the appropriate locations. Since the starting address of samples containing MICR data is known and the representative noise waveform is defined, synchronization entails determining which sample of the representative noise waveform should be used to compensate the first MICR sample. One technique of synchronizing is to locate the start of the periodic noise just prior to the beginning or just after the end of the MICR samples. Since the memory location represent time increments the difference between the start of the MICR signal can be used as an offset into the representative noise waveform to start the compensation of the MICR containing samples.

Assuming that samples are stored in successive memory locations with one sample per addressable memory location then:

$$j=|X-Y|/n_L$$

where:

$n_L$ is the length of the noise wave form period in samples, and j is index into the characteristic noise waveform.

X is the starting address of the composite signal (MICR+ noise)

Y is the starting address of any periodic noise period which corresponds to the start of the representative noise waveform.

Assuming the representative noise waveform is stored starting at memory location Z. Then the following algorithm can be used to compensate for noise in the composite samples:

```
j = REMAINDER(|X − Y|/n_L)
For i = 0 to (NUMBER_13_MICR_SAMPLES − 1)
    [X + i] = [X + i] − [Z + j]
    j = j + 1
    If j = n_L − 1 then j = 0
end For i;
```

Note brackets [ ] indicate the contents of a memory location at the memory address specified by the terms within the brackets as opposed to the memory address itself.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. An apparatus for decoding magnetically encoded information comprising:
    a magnetic read head for providing a time varying electrical signal;
    an amplifier for amplifying the time-varying electrical signal from the magnetic read;
    an A/D converter for converting the amplified time varying signal to a stream of digital samples;
    a memory;
    a microcontroller;
    wherein the microcontroller stores the samples in the memory, extracts a representative noise waveform using samples stored in the memory that are identified as not containing a magnetically encoded signal, and compensates the samples in memory identified as having a magnetically encoded signal using the representative noise waveform.

2. The apparatus of claim 1 further comprising:
    a bandpass filter to filter the amplified time varying electrical signal.

3. The apparatus of claim 1 further comprising:
    a decoder for decoding the compensated samples to provide characters.

4. The apparatus of claim 3 wherein the decoder outputs the characters.

5. An apparatus for decoding magnetically encoded information comprising:
    a magnetic read head for providing a time varying electrical signal;
    an amplifier for amplifying the time-varying electrical signal from the magnetic read;
    an A/D converter for converting the amplified time varying signal to a stream of digital samples;
    a memory;
    a microcontroller;
    a signal detector for identifying a first plurality of samples containing a desired signal;
    a noise characteristic module for analyzing a second plurality of samples not identified as having the desired signal to provide a representative noise waveform, the representative noise waveform having a plurality of noise values that are characteristic of periodic noise;
    a compensator for compensating each sample of the first plurality of samples with a noise value from the representative noise waveform; and
    a decoder for decoding the compensated first plurality of samples to provide characters.

6. The apparatus of claim 5 wherein the compensator synchronizes the representative noise wave form with the first plurality of samples prior to compensating the samples.

7. The apparatus of claim 6 wherein the noise characteristic module determines each noise value of the representative noise waveform using samples from at least three noise periods.

8. The apparatus of claim 7 wherein the noise characteristic module determines each noise value of the representative noise waveform by averaging samples from the noise periods.

9. A method for identifying a magnetic ink characters printed on a document which is passed by a magnetic read element the magnetic read element producing a time varying electric signal that is indicative of the magnetic field detected at the head, the time varying electric signal including electrical signals generated when a document containing magnetic ink characters moved passed the head and a period where no magnetic ink characters are near the head the method comprising the steps of:
    receiving a time varying electrical signal;
    sampling a time varying electrical signal at successive time intervals;
    storing the samples;
    identifying a plurality of samples that are representative of magnetic ink characters;
    creating a representative noise waveform having a set of values characteristic of periodic noise source, using samples that were not identified as representative of magnetic ink characters;
    synchronizing the noise waveform with the plurality of samples representative of magnetic ink characters;
    compensating the plurality of samples representative of magnetic ink characters with the synchronized noise waveform;
    recognizing the magnetic ink characters from the compensated plurality of samples.

10. The method of claim 9 further comprising the step of:
    amplifying the time varying electrical signal.

11. The method of claim 10 further comprising the step of:
    outputting the recognized magnetic ink characters.

12. The method of claim 11 further comprising the step of:
    filtering the time varying electrical signal with a bandpass filter.

13. The method of claim 10 further comprising the step of:
    filtering the time varying electrical signal with a bandpass filter.

14. The method of claim 9 further comprising the step of:
    outputting the recognized magnetic ink characters.

15. The method of claim 14 further comprising the step of:
    filtering the time varying electrical signal with a bandpass filter.

16. The method of claim 14 wherein the step of storing is started in response to a cue.

17. The method of claim 9 further comprising the step of:
    filtering the time varying electrical signal with a bandpass filter.

18. The method of claim 9 wherein the step of storing is started in response to a cue.

19. An article of manufacture comprising a processor useable medium having a processor readable program embodied in said medium, wherein the processor readable program when executed on a processor causes the processor to:
    receive a time varying electrical signal;
    sample a time varying electrical signal at successive time intervals;

store the samples;

identify a plurality of samples that are representative of magnetic ink characters;

create a representative noise waveform having a set of values characteristic of periodic noise source, using samples that were not identified as representative of magnetic ink characters;

synchronize the representative noise waveform with the plurality of samples representative of magnetic ink characters;

compensate the plurality of samples representative of magnetic ink characters with the synchronized noise waveform; and recognize the magnetic ink characters from the compensated plurality of samples.

20. The article of manufacture of claim 19 further comprising the step of:

outputting the recognized magnetic ink characters.

* * * * *